United States Patent
Venables et al.

(10) Patent No.: US 10,538,299 B2
(45) Date of Patent: *Jan. 21, 2020

(54) PREDICTIVE SEA STATE MAPPING FOR SHIP MOTION CONTROL

(71) Applicants: John D. Venables, Monroe, CT (US); Christopher M. Pappas, Saint Leonard, MD (US); Benton H. Schaub, Jr., Gambrills, MD (US)

(72) Inventors: John D. Venables, Monroe, CT (US); Christopher M. Pappas, Saint Leonard, MD (US); Benton H. Schaub, Jr., Gambrills, MD (US)

(73) Assignee: Naiad Maritime Group, Inc., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,408

(22) Filed: Mar. 11, 2019

(65) Prior Publication Data
US 2019/0202534 A1    Jul. 4, 2019

Related U.S. Application Data

(63) Continuation of application No. 14/062,634, filed on Oct. 24, 2013, now Pat. No. 10,259,544.
(Continued)

(51) Int. Cl.
*B63B 39/00* (2006.01)
*B63B 39/06* (2006.01)
(Continued)

(52) U.S. Cl.
CPC ............. *B63B 39/00* (2013.01); *B63B 39/06* (2013.01); *G05D 1/0875* (2013.01); *B63J 2099/006* (2013.01)

(58) Field of Classification Search
None
See application file for complete search history.

(56) References Cited

U.S. PATENT DOCUMENTS

| 3,818,959 A | 6/1974 | Larsh |
| 5,787,832 A | 8/1998 | Spinka |
| (Continued) | | |

FOREIGN PATENT DOCUMENTS

| GB | 2320829 A | 7/1998 |
| WO | 03053776 A1 | 7/2003 |
| WO | 2011159832 A2 | 12/2011 |

OTHER PUBLICATIONS

Rijkens, et al., "Improving the Sea Keeping Behaviour of Fast Ships Using a Proactive Ride Control System", Dec. 2013; p. 1-10.
(Continued)

*Primary Examiner* — Nicholas K Wiltey
(74) *Attorney, Agent, or Firm* — St. Onge Steward Johnston & Reens, LLC (57) ABSTRACT

A motion control system for a ship has one or more sensors generating sea condition data and at least one ship control system. Analyzer software receives the sea condition data and predicts a sea condition event. Calculator software calculates one or more commands in preparation for the sea condition event. Interface software communicates the one or more commands to the at least one ship control system and the at least one ship control system implements a command in advance of the event. The at least one ship control system may comprise a ride control system having one or more motion control devices. The at least one ship control system may also comprise an auto pilot system.

19 Claims, 7 Drawing Sheets

Related U.S. Application Data (60) Provisional application No. 61/717,834, filed on Oct. 24, 2012.

(51) Int. Cl.
*G05D 1/08* (2006.01)
*B63J 99/00* (2009.01)

(56) References Cited

U.S. PATENT DOCUMENTS

| | | | |
|---|---|---|---|
| 6,064,924 | A | 5/2000 | Fleischmann |
| 7,029,340 | B2 | 4/2006 | Smith |
| 7,451,715 | B2 | 11/2008 | Koop et al. |
| 8,215,252 | B1 | 7/2012 | Chun |
| 2005/0109258 | A1* | 5/2005 | Smith .................. B63B 1/24 114/274 |
| 2005/0278094 | A1 | 12/2005 | Swinbanks et al. |
| 2008/0255757 | A1 | 10/2008 | Bruce et al. |
| 2009/0271054 | A1 | 10/2009 | Dokken |
| 2010/0094491 | A1 | 4/2010 | Oehlgrien et al. |
| 2010/0185471 | A1 | 7/2010 | Chen et al. |
| 2012/0095946 | A1 | 4/2012 | Hansen et al. |
| 2012/0253566 | A1 | 10/2012 | Ballou et al. |

OTHER PUBLICATIONS

Young Jun Yang, et al., "Prediction for Irregular Ocean Wave and Floating Body Motion by Regularization: Part 1. Irregular Wave Prediction", Transactions of Famena XL-4 (2016), pp. 41-54.

Dannenberg, et al., "The on Board Wave and Motion Estimator OWME", International Society of Offshore and Polar Engineers, 2010, pp. 1-8.

* cited by examiner

PREDICTIVE SEA STATE MAPPING FOR SHIP MOTION CONTROL

FIELD OF THE INVENTION

The present teachings relate generally to systems and methods for stabilization and, more particularly, ship motion control.

BACKGROUND OF THE INVENTION

Ships are subjected to changing sea conditions. As a result, various types of stabilization techniques have been employed such as, for example, stabilizers to counteract roll caused by wind or waves acting on the ship. Traditionally, such stabilizers were rigid equipment attached to the ship, such as keels and fins. U.S. Pat. No. 3,818,959, entitled "Ship stabilizer fin," the content of which is incorporated by reference in its entirety, discloses one such fin for ship stabilization.

More recently, active ship motion control systems have been used to help stabilize a ship. Such systems comprise actively controlled fins or rotors, internal stabilizers, etc. U.S. Pat. No. 7,451,715, entitled "Active roll stabilisation system for ships," the content of which is incorporated by reference in its entirety, discloses a sensor for sensing a ship's movements and delivering control signals for damping the ship's movements.

Known ship motion control systems rely upon sensors that measure a ship's motion. This motion information is used to produce a reactive countering force with motion control devices (MCD) (e.g., fins, foils, interceptors, trim tabs, T-foils, lifting foils, rotors, gyroscopes, rudders, steerable water jets, movable weights, anti-roll tanks, etc.) to dampen the motion. However, reliance on reacting to currently-sensed ship conditions is limited since at the time of the event it may already be too late to adequately compensate for the conditions. Therefore, it would be beneficial to have a superior system and method for predictive sea state mapping for ship motion control.

SUMMARY OF THE INVENTION

The needs set forth herein as well as further and other needs and advantages are addressed by the present embodiments, which illustrate solutions and advantages described below.

The system of the present embodiment includes, but is not limited to, one or more sensors generating sea condition data, at least one control system, and a computer. The computer has an analyzer receiving the sea condition data and determining a predicted sea condition, a calculator calculating one or more commands in preparation for the predicted sea condition, and an interface communicating the one or more commands to the at least one control system. The at least one control system automatically implements at least one of the one or more commands in advance of the predicted sea condition.

In another embodiment, the system of the present embodiment includes, but is not limited to, a plurality of sensors generating sea condition data, the sea condition data including sea conditions in both the seafaring vessel's far field and near field, a motion control system having one or more motion stabilization devices, and a computer. The computer has an analyzer receiving the sea condition data and determining a predicted sea condition, a calculator calculating one or more commands in preparation for the predicted sea condition, and an interface communicating at least one of the one or more commands to the motion control system. The motion control system automatically activates the one or more motion stabilization devices in advance of the predicted sea condition using the at least one of the one or more commands.

The method of the present embodiment includes the steps of, but is not limited to, providing a control system, detecting sea conditions using one or more sensors, determining a predicted sea condition, on a computer, using the detected sea conditions, calculating one or more commands, on a computer, using the predicted sea condition, and sending the one or more commands to the control system. The control system automatically implements at least one of the one or more commands in advance of the predicted sea condition.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

According to the present teachings, a ship motion control system may rely on calculating a prediction of anticipated sea conditions so that adjustments can be made in advance. As used herein, the term "predicted sea conditions" includes both sensed approaching conditions (e.g., already existing conditions approaching ship) and calculated future conditions (e.g., not yet existing conditions), although not limited thereto. For example, one not yet existing condition may be a situation where multiple smaller waves are predicted to combine into a larger wave, or a larger wave is predicted to split into multiple smaller waves, based upon sea conditions, although not limited thereto. This differs from known systems that rely on reacting to sensed conditions. For vessels equipped with motion control systems (e.g., such as devices from Naiad Dynamics®), input data from one or more sensors may enable the system to send a proactive command to motion control devices to suppress motions before they begin. This results in more effective ship motion control than a reactive command.

The present teachings may incorporate existing (e.g., "standard", etc.) motion control systems (MCS) to prepare the ship accordingly. MCS may include, for example, a ride control system (RCS), autopilot, steering system, stabilizer system, etc. While discussed generally in terms of an MCS, the present teachings are not limited thereto. What is desirable is to predict future conditions for any type of vehicle and to make modifications in preparation thereof.

For vessels equipped with an auto-pilot system, a change in course can be initiated to avoid areas of high wave energy, etc., in order to further enhance stability. The system may also be equipped with conventional motion sensors, enabling the system to compile data to "self-tune" and automatically adjust.

In one embodiment, the present teachings comprise evaluation of "far field" conditions. The evaluation of the ship's far field may be used to determine the nature of the sea conditions (e.g., averages, etc.) that the MCS will be encountering. This permits evaluation of changes in a field profile to inform changes in MCS command weights and effectiveness assessment.

Such a system allows for calculating changes to the ship's course (e.g., course management, etc.) to provide for the most effective MCS while maintaining an overall course objective. For example, although not limited thereto, a schematic plot of green vs. red shaded relative headings could be presented to the captain of a ship based on sea conditions along the current projected course. As further discussed below, this may be based on a knowledge base built on MCS and effectiveness as well as vessel response to conditions.

The evaluation of the "near field" conditions may be used to predict the magnitude and severity of the next event (e.g., wave encounter, etc.), although not limited thereto. In one embodiment, it may include mapping of the near field seas. Knowledge of a local wave profile for approaching sea conditions provides feedback that can be used to reduce motions of the ship's hull. The hull can be maneuvered to avoid the worst conditions or the MCS can be used to set up the most favorable geometric attitude relative to the sea surface, although not limited thereto.

For a fast-moving boat operating in large seas relative to its draft, this can be a critical predictor of events such as "launching," where the hull becomes partially or fully airborne and subsequently reenters the water with an impact. In an 11 meter rigid-hulled inflatable boat (RNIB) traveling in the dark at 40 knots in 3' waves, for example, launching may lead to damaged joints and other more extreme physical damage to the ship and crew. In a larger ship (e.g., 30+ meters, etc.), launching could result in catastrophic structural damage. Such ships typically do not "launch" unless planing at a very high speed in extreme conditions, such as for the purpose of racing or some other event. Evaluation of the slope and duration of waves that lead to this type of event may be used to inform the MCS and the operator to minimize any such impact.

The combination of long term sea state characterization statistical inputs, short term sea state wave mapping inputs, and real time motion sensor package calculations of vessel motion history, may all be used to automatically provide MCS inputs, although not limited thereto.

The present teachings may utilize one or more sensors to scan the area adjacent to the vessel (e.g., along the projected course, etc.), and analyze the contours of the water's surface. This can be used to detect wave energy that may lead to undesirable vessel motion. Navigational radar, microwave radar, ultrasonic detectors, stereo-optic imaging, and LiDAR (Light Detection and Ranging) laser systems, among others, may be used. They may be adapted to suit particular vessel parameters, operational requirements and performance objectives. The system may incorporate radar/lidar/flir/ultrasonic/video/etc. input to provide input to the MCS, although not limited thereto.

Improvement in the method of operator input to the MCS significantly enhances the use and effectiveness of the MCS equipment. The addition of adaptive software and improved gain scheduling maximizes effectiveness and helps to relieve the operator of these tasks.

Greater ride quality enhancement results from the use of long and short range characterization of the sea states and waves in anticipatory type MCS. The long range information may be used to plot a course through areas of low wave energy. This may be updated as the vessel progresses towards the destination. The short range information may be used to drive minor course changes along the long range path to avoid high energy waves which are not resolved with the long range data.

Figure 1:
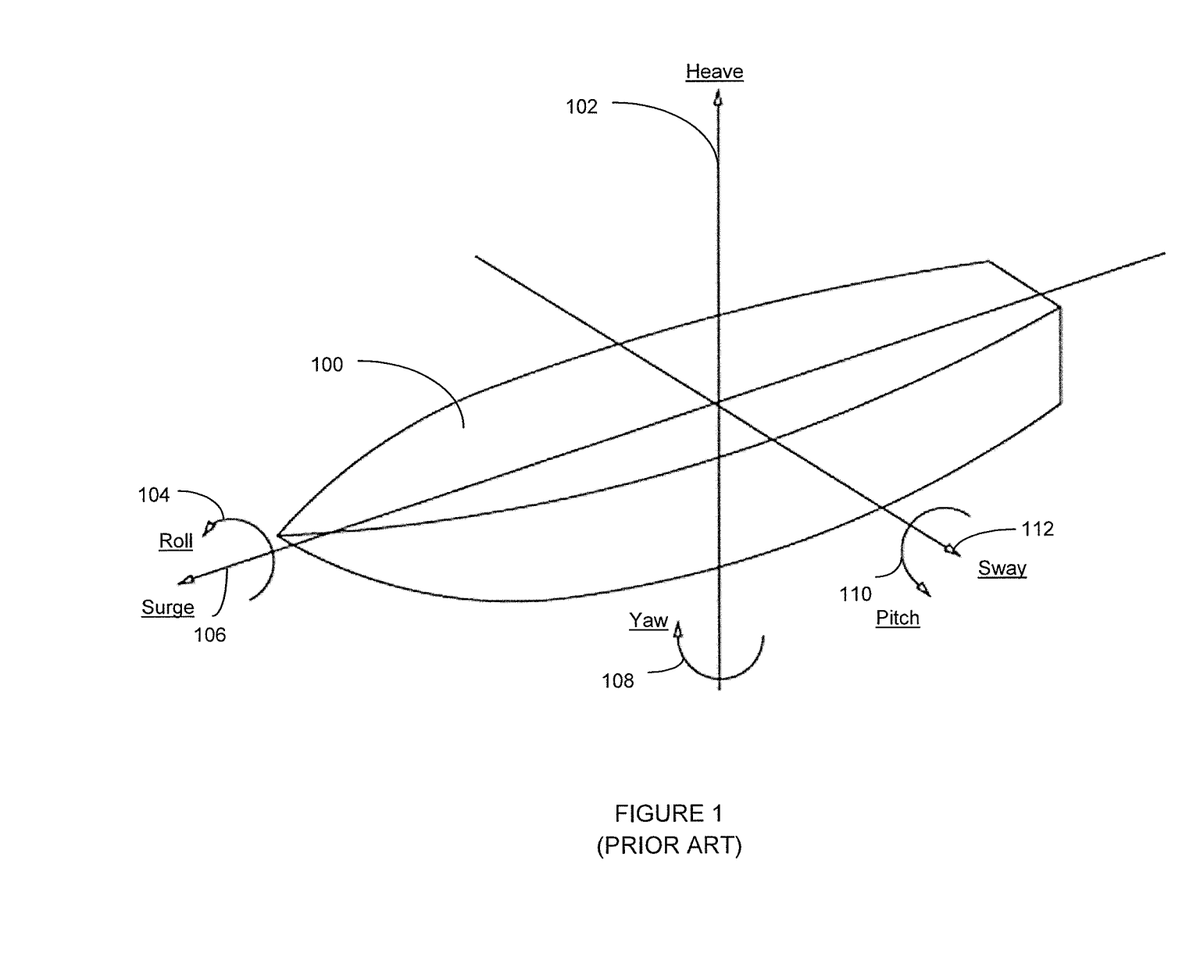
FIG. 1 is a diagram depicting a number of ways sea conditions (e.g., waves, wind, currents, etc.) can affect a ship.

Referring now to FIG. 1, shown is diagram depicting a number of ways sea conditions (e.g., waves, wind, currents, etc.) can affect a ship 100. These include heave 102, roll 104, surge 106, yaw 108, pitch 110, and sway 112, or any combination thereof. Each of these movements can have dangerous effects on a ship 100.

Figure 2:
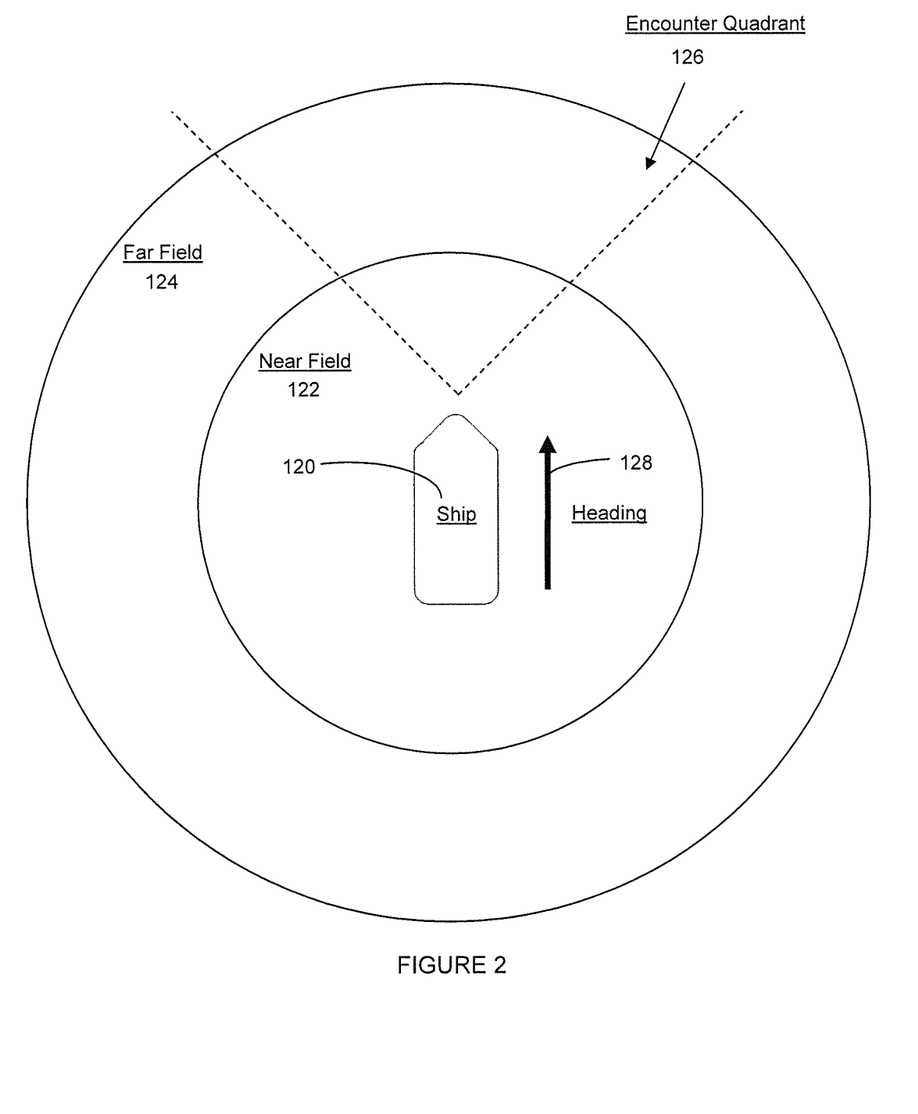
FIG. 2 is a diagram depicting the near field, far field and encounter quadrant along a ship's course.

Referring now to FIG. 2, shown is a diagram depicting the near field 122, far field 124 and encounter quadrant 126 along a ship's 120 heading 128. The encounter quadrant 126 may vary based on the sea state approach and ship 120 speed, although not limited thereto. For example, when the ship 120 is underway at a speed faster than the waves, the encounter quadrant 126 may be the "heading quadrant." However, when the ship 120 is slower than the waves or not underway (e.g., at anchor, adrift, etc.), the encounter quadrant 126 may be the direction of approaching sea conditions (e.g., waves are overtaking it). The encounter quadrant 126 may comprise any area of concern for the ship. For example, it may comprise a 90 degree angle of view, 180 degrees, or even a full 360 degree area around the ship 120, although not limited thereto.

In vessels having difficulty entering port at lower speeds in a large following sea, a yaw autopilot may be improved by knowledge of approaching sea conditions from, for example, the astern quadrant (rather than the forward quadrant). The orientation of the quadrant may be important for sensing the future encounter wave profile. In some pure beam cases a wider azimuth range of encounter prediction is of use. For instance, the deep water wave follows a relatively simple set of relationships between wave length, period and velocity (wave celerity): $L_w = g \cdot T_w^2 / 2\pi$ meters, where $L_w$ is wave length, $T_w$ is wave period and g is gravity in metric units, 9.81 meters/second$^2$.

If a vessel is rolling with a natural period of 6 seconds, a wave length in beam seas of $9.81/2\pi E \cdot 6^2 = 56.2$ m will have a 6 second period and couple strongly with rolling motions in beam seas. Given the length of the wave, $L_w$, the period may be predicted: $Tw = [2\pi \cdot L_w / g]^{1/2}$ seconds. In this case if the wave length is 56.2 m the period will be 6 seconds.

Wave velocity may be calculated as $L_w / T_w$ or wave celerity, $V_c = [g / 2\pi \cdot L_w]^{1/2}$ m/second. For this example, the wave speed will be 9.37 m/sec or 18.2 knots.

Many vessels are very soft in yaw and have a long period if they are stable, and thus a hull proceeding at 12 knots being overtaken slowly by the wave can present directional control challenges. This is the case when the ship is operating down sea (following and stern quarter) where the velocity of wave propagation is greater than hull speed and the wave is catching up to the hull.

The forward quarter may be used for higher speeds. For instance, the encounter of a bow quarter sea at a heading of 135 degrees between the heading of the ship and the direction of wave propagation, a wave is encountered at a local angle of 45 degrees and the distance to travel from one crest to the next is 1.414*$L_w$. This distance during the encounter period is the sum of the ship's forward advance and the wave celerity advance along the line of encounter. Keeping in mind that $\omega=2\pi f$, where $\omega$ is circular frequency in radians/sec and f is frequency in cycles per second or Hz, then $\omega=2\pi/T$, where T is the period in seconds/cycle. An equation for encounter frequency, $w_e$, is $w_e=w_o-[w_o]^2/g*U_o*\cos(\mu)$, where $w_o$ is the wave frequency, $U_o$ is the ship's velocity of advance and $\mu$ is the course relative to the waves.

Control input may use measurement of far field 124 sea conditions along the vessel's designated course 120. This may represent sea conditions over an area greater than a minimum distance representing the time necessary for computation of statistical measures of the conditions, which may be up to several kilometers or more.

Long range sea state characterization of the far field 124 may provide a statistical view of the larger sea state around the vessel. The output may include significant wave height and direction of the seas. This information is useful as an input to provide automated optimization of the MCS pitch/roll/yaw gain schedule.

The statistical map of the sea state ahead of the vessel may also be used as an input to the automated vessel course heading/autopilot. In this case, the data map may provide a path of lower wave height/sea states which the autopilot would use for course heading. The vessel may steer toward the destination, but through the statistical areas of lower wave energy to reduce vertical accelerations. The course may vary as a moving section toward the destination, updated as the sea state map is updated.

The data to compile the moving average of the far field sea state may be collected through back scatter of an existing ship board radar system. Back scatter is typically discarded as noise so the operator can focus on other vessels or objects of concern. The back scatter can be examined to provide indication of the frequency of waves, the intensity or energy of the waves, as well as the predominant wave train direction. The collected data may be compiled into moving average of wave energy, length and direction over a period of time.

Further, predictive wave slope computation may be performed on the near field 122. The near field 122 may be defined as an area that includes sufficient wave lengths out from the vessel's encounter course to offer a predictive measure of anticipated encounter with sufficient lead time to take corrective action and/or evaluate the effect of corrective action on the future predicted encounter. The size of the near field 122 may extend from a fraction of a second of forward advance distance (e.g., a minimum distance and time necessary to implement a beneficial modification of the hull's motions, etc.) to several orders of magnitude of wave length for the worst-case wave, although not limited thereto.

Regardless of the sea encounter direction (e.g., head, beam, bow or stern quarter, or following, etc.), the slope and extent (e.g., duration, etc.) of the encounter wave may be used as a predictor of the resulting severity of motion. As seas become larger and steeper, the resulting ship motions that occur when the ship transits the wave become more severe. Near field mapping may utilize input from one or more sensors (or sensor arrays, etc.) to provide a measure of the severity of approaching waves.

In one embodiment, short range sea state prediction of the near field 122 may use short range sensors to provide input for deterministic sea wave prediction (DSWP). This may use short range radar to provide data on the immediate waves approaching the vessel from any direction. This may be limited by the mast height of the sensor mounting, but preferably is approximately 2-4 wave lengths, depending on the wave period, or 30 seconds, depending on the encounter frequency. Use of this output as a determination of the immediate wave front a few seconds ahead of the vessel and the distribution across the wave front is helpful in course correction. This input may be used to provide a course heading to direct the vessel away from the area of high wave energy towards lower energy and reduced vertical acceleration.

There is a desire to balance between the size of the sensor area in the near field 122 and the size of wave that may result in extreme motion of the ship and detection and characterization of sets of waves and prediction of their propagation characteristics. This may be satisfied with a multiple range, time correlated, scanning technique. In one embodiment, a Fourier representation of the sea surface may be used to predict future sea shapes (e.g., versus identifying approaching sea conditions). Key implementation elements may depend on dedicated signal processing capabilities based on successive "snap shots" of the sea surface (e.g., at relatively low data rates such as 1 to 10 samples per second, etc.) over a grid of sampling points over the representative area of sea surface.

In previous examples, "steepness and height" criteria were used as predictive inputs. However, direct knowledge of future events may be provided by one or more sensors that can "map" the sea, although not limited thereto. As such, LiDAR or a similar technology may provide a direct measure and input to the control system.

Prediction of sea state characteristics may break down into data input and analysis to inform system design, and output in the shorter term and longer term actions. It may be preferable to use "near future" events, such as those with a few seconds lead time (e.g., similar to the natural response period in roll, pitch, heave or yaw, etc.), to map the sea. A ship's immediate history of motions may inform the system of probable future motions. Knowledge of the short term database of responses may suggest future events.

For example, on a vessel having an 8-second natural roll period, roll rate may be the maximum in worst-case rolling sets (e.g., several wave encounters driving rolling motions, etc.), 2 seconds before roll angle is maximum (e.g., for a pure 0.125 Hz sinusoidal response, etc.). That may be too small of a lead and effectiveness may be reduced by the phase shift (lag) in the action of motion control devices (e.g., fins, foils, interceptors, trim tabs, T-foils, lifting foils, rotors, gyroscopes, rudders, steerable water jets, movable weights, anti-roll tanks, etc.).

When the roll rate is at its maximum, the hull may have acquired the maximum angular momentum that must be countered to damp the roll motion. Therefore, it may be desirable to lead the rate signal as much as possible. If the gain is sufficiently high in the stable range, the system may reach saturation maximum command before the rate signal reaches maximum. Too much gain may lead to instability.

Other than immediate announcements, such as fault lights and sounds to indicate adverse conditions such as temperature or pressure limits, these events take place very quickly and modifications of control strategies may be part of the designed system response.

"Far future" events (e.g., tens of seconds, multiple natural period intervals, to minutes, etc.) may be used for optimization of a number of control strategies. For example, these may be used to recommend changes in system configuration such as gains, equipment parameters (e.g., pump alignments for hydraulic supply, etc.), as well as other ship systems. Such changes may be useful both for immediate and future implementation.

Operational parameters (e.g., speed, heading, etc.) may be modified to improve projected motions. For example, if a vessel is not underway but an oncoming wave has been detected, it may be preferable to position a fin to provide for maximum movement (e.g., preparing fin to respond to wave). Far future analysis may also inform the operators of trends (whether favorable or unfavorable). Visual displays may show operators projected and recommended courses of action.

Figure 3:
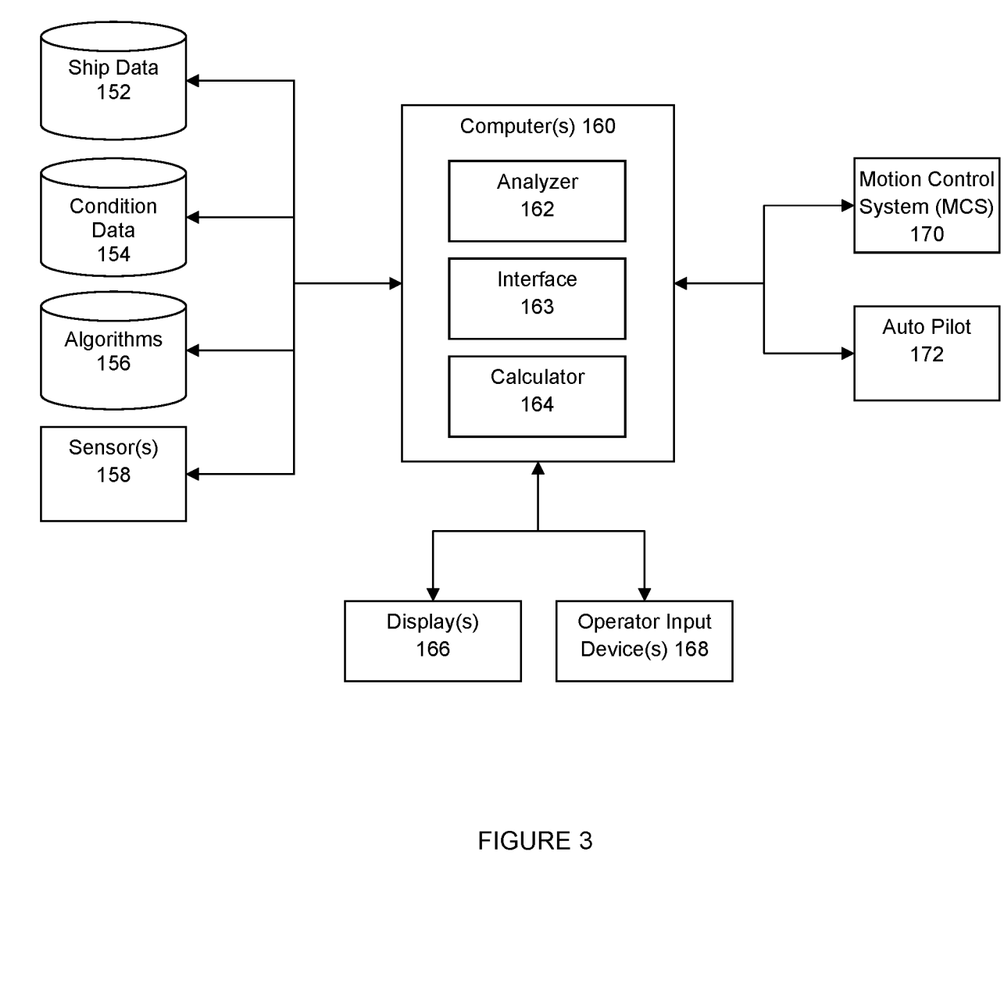
FIG. 3 is a schematic diagram of one embodiment of system according to the present teachings.

Referring now to FIG. 3, shown is a schematic diagram of one embodiment of system according to the present teachings. A number of benefits are realized by statistical mapping and motion characterization. For example, it permits evaluation of present and recent past conditions. The system may comprise one or more computers 160 having hardware configured with software executing on computer readable media. The one or more computers 160 may comprise multiple computers in electronic communication with each other over a network.

The computer(s) 160 may comprise an analyzer 162 that analyzes conditions (e.g., at the ship, at near field, at far field, etc.) using sensors 158. Discussed further below, the analyzer 162 may also analyze stored ship data 152 and condition data 154, although not limited thereto. One or more algorithms 156 may be used to analyze input data.

One or more sensor(s) 158 may be used to anticipate sea conditions to provide an input that optimizes algorithms used by the motion control system. This provides future knowledge of the sea as it is developing to improve optimization of the gains and the weighting of the various control inputs to optimize the overall performance of the motion control algorithms. This may include the history of past motions and the expected motions based on measurements of the approaching sea conditions.

Measuring approaching sea conditions may be performed using a sensor that can be either active or passive depending on operational requirements. For military applications, passive sensors may be optical, ultrasonic (with limited range), etc., and which are not easily detected at a range of more than a few hundred meters. Radar, laser or other sensors that range out to a kilometer or more may reveal themselves to others in the operational area and may not be preferable for military applications.

The present teachings may be utilized with current motion sensor packs (MSP), which may include:
Linear accelerations in a ship's X, Y and Z axes.
Angular rate measurements using solid state gyro technology about the ships' X, Y and Z axes.
Angular measurement of the rigid body attitude relative to the gravity vector using inclinometers for pitch and roll angles.
Measurement of heading based on input from the ship's heading gyro, magnetic compass or global positioning satellite (GPS) systems.

There are other possible measurements that for one application or another (such as running depth for Small Waterplane Area Twin Hull (SWATH) vessels, foil-assisted vessels, etc.) have been utilized and may be used, particularly if the application is generalized to yaw control and autopilot functions as extensions of the capability.

An MSP may be configured for a range of direct and indirect measurements. These can consist of direct measurements of roll, pitch and yaw angles and rates as well as tri-axial measurements of acceleration of the rigid body (ship's structure).

A leading term such as roll (pitch or yaw) acceleration may be used to improve control. For example, at 100 points per second from a roll rate gyro a smoothed roll rate first derivative estimate of roll acceleration can predict increases or reductions in roll rate which will occur 2 seconds later for an 8 second roll period. This may be implemented using a low pass digital filter.

A smoothed projection through 0.5 or more seconds worth of roll rate data may be calculated using a continuous least squares smoothing of 2nd or 3rd order (e.g., differs from the low pass filter). The phase shift may be equivalent to the projected estimate of the acceleration based on the least squares coefficients and the leading period of the calculation. This may lead to a different result than the low pass filter approach.

Rigid body roll accelerations may also be measured by mounting Z-axis accelerometers. In one embodiment, one may be mounted to port and the other to starboard at a radius, R, from the centerline and subtracting the signal between them canceling gravity and summing the +/−vertical acceleration which can be converted using the equation R*(Azp−Azs) position as a function of the roll acceleration.

Inertia-torsion devices may also be used to measure angular acceleration. These devices are analogous to the mass-spring type of linear acceleration measurement.

It is also possible to incorporate heave rate feedback. It is a particularly useful feedback signal when the system includes T-foil(s) forward and trim tabs or interceptors aft. The combination, in phase command, both forward and aft, damps the heave motion and reduces acceleration over the entire length of the hull, both port and starboard. Heave rate may be obtained by integrating vertical acceleration to produce rate. The duration and filtering of the integration may take into account the hull's response and the frequency range of interest. A second integration of vertical acceleration may provide heave amplitude and, if evaluated as a frequency analysis, an estimate of the sea condition if the heave response amplitude operator (RAO). GPS may be used as a form of heave measurement system. Root Mean Square (RMS) "altitude" may be an indicator of sea conditions.

Yaw damping may also be a possible function using a yaw rate gyro and yaw acceleration terms. Course keeping (e.g., using rudders, water jets, yaw fins, steerable interceptors, etc.) may be enhanced with average heading objectives obtained from external devices such as GPS, ship's gyro, ship's autopilot, etc.

Any number of external sensors may be used with the present teachings as leading predictors of sea conditions as well as the ship's current motion, although not limited thereto. For example, wave height and spectrum data may be correlated with incoming radar and local sensor data to correlate the radar's field of view with the actual measurements when the hull reaches the "past" measured sea. The data may be decomposed to a past snapshot of the wave profile and then be transformed into a projected future profile based on phase relations and propagation velocities of the wave components. This may use a model of the propagation of the sea over time as the window of data acquisition is extended further forward on the vessel course. This may be an input to a schedule of gain values and weights to inform the effect of course or speed changes.

Stored data may also be used to analyze predicted conditions and associated preparations. In one embodiment, storage for ship data 152 may be provided. This may include information on the ship's capabilities, its past response times to similar events (e.g., movements, etc.), planned course, equipment statuses (e.g., identify broken equipment, etc.), cargo (e.g., placement and weights on the ship, etc.), although not limited thereto. It may also include preferences, such as the maximum allowable movement for the ship, trip, etc., although not limited thereto. This information may be used to inform the system of the ship's capabilities and, as a result, its ability to prepare for an approaching wave, although not limited thereto.

In one embodiment, one or more of the storages (e.g., databases, etc.) may be accessible over a network such as the Internet. In this way, such storages may provide for centralized collection and distribution of data. For example, the system may collect and cross-reference data on all similar types of ships, which may inform the system about the ship's capabilities during a certain type of event. In another embodiment, the storage(s) may collect information on sea conditions from all ships in the same geographic region. One skilled in the art would appreciate the many ways that "crowd sourcing" of relevant data may be used with the present teachings, which are not limited to any particular embodiment disclosed herein.

In one embodiment, storage for conditions data 154 may be provided. One input to any "mapping" or prediction of sea conditions may be derived from knowledge of the sea conditions that have been encountered over time. In one embodiment, this may be the previous 20 minutes, 20 hours, 20 days, etc., and the present teachings are not limited thereto. Shorter or longer periods may be used based on the measured "stationary" of the sea conditions. This may be obtained from the ships motion sensor pack, although not limited thereto. Height of the sea encounters may be obtained by direct integration of X, Y and Z axis acceleration measurements. Numbers of and duration of each encounter, the severity of the motions, of accelerations and angular motions pitch, roll and yaw, in both magnitude of the angle and the rates at which the ship responded, as well as the derived angular accelerations, may provide a basis for calculating an approximation of the future.

Historical knowledge of event sequences may form tables that stretch into the past history of motions and are modified as conditions change. For example, large heave magnitudes in the upward direction, above the mean sea surface, may generally precede large, low G, "falls" that end in high slam accelerations for a particular set of operating conditions. When these are met, even for a few minutes, a motion control algorithm may be self-modifying based on the accumulated knowledge base of the ship's past performance, perhaps over a large number of voyages and many hours of operation in a variety of sea conditions, as defined by the knowledge database.

It may be desirable to use a control system to force contouring when traversing a sea with a substantial vertical displacement from the mean sea level. That value (e.g., steepness and height integration, etc.) may provide an input to the control algorithm for pitch control in addition to the pitch rate which would tend to be negative near the crest of the wave, thus generating a retraction of the control surfaces that would tend to hold the bow up rather allowing it to fall and contour down the face of the wave.

The computer(s) 160 may also have interface(s) 163 for communicating with various ship systems. The computer(s) 160 may take the inputs of sensors 158, databases 152, 154, and others, to provide for the ship's motion control system (MCS) 170. A calculator 164 may work together with the analyzer 162 to develop appropriate ship preparations for the predicted conditions (e.g., event, etc.). This may include the calculation of commands for motion control devices, a piloting system, and other ship equipment (e.g., charging electrical or hydraulic power systems in anticipation of use, etc.), although not limited thereto.

The input of "future knowledge" to a course modification display and to the MCS 170 may provide optimized parameters as the ship's course and the seas change. In the first instance the crew may evaluate the presentation of sea conditions to determine if they can improve the ship's motion control by changing course or speed. The analysis may suggest heading and speed to minimize adverse effects (e.g., sea sickness, fatigue, etc.).

The functionality of software 162, 163, 164 may form individual software packages or subroutines, or may all be part of the same package, although not limited thereto.

The system may comprise one or more displays 166 and input devices 168 (e.g., touch screen, keyboard, mouse, etc.) to provide output on the analysis and calculation to operators. For example, a display 166 may project the best control conditions. It may also provide alerts to the operator, for example, if the system has identified a "rogue" wave. Course, speed, heading, distance and time objectives for the voyage may be part of the analysis for recommending the best combinations of speed and heading given the mapped sea conditions. For example, the system may predict the motion associated with a change in heading or speed so that the operator can evaluate the change. The interface 163 may provide for communication with an auto pilot 172, although not limited thereto. As discussed previously, the system may use the results of any course change as an input to the utilization of the knowledge database. Input devices 168 may provide for operators to select data to view, modify commands, etc.

Algorithms for analyzing input data may include filtering, statistical data analysis, frequency analysis, data base development and modification, combined with control technology, although not limited thereto.

Trends and knowledge from a long term (e.g., vessel properties) and immediate past, database with projected future conditions estimated from external inputs.

Evaluation of projected ship motions and their incorporation in real-time ride control algorithms.

Modification of response based on knowledge of system capabilities.

Projection of future conditions for operator's ship control decisions: Increase or reduce speed; Change heading; Alerts to impending conditions (trends of RMS motions for instance); Polar plots of future motions on projected relative headings; etc.

Algorithms may be based on standard operations such as frequency analysis of the vessel's motions, as measured by a MSP, which are correlated and/or integrated with the predictive data set from external sensors and the system response knowledge base (RAOs for the hull, device limits including angle range and peak flow limiters, etc.) to "inform" command optimization and maximize anticipatory command rather than reactive command.

External signals indicating near field wave encounter slope or duration (e.g., period, height, length of encounter slope, etc.) may inform the "immediate" control algorithm. Longer term, the display may suggest course optimization to minimize an objective sea keeping measure such as MSI (e.g., motion sickness incidence, etc.), or RMS vertical acceleration in the ship's lounge, etc., based on past MSI (e.g., for the immediate past, last 20 min projected to 2 hour duration, etc.).

The MCS may be self-modifying using the data from external sensors and known course input from a GPS navigator system to compare with the recent (e.g., 20 to 30 minutes, etc.) and baseline history data for the vessel and current sea conditions. The external sensors may also provide a history of current sea conditions (e.g., using radar, LiDAR, short range sensors, etc.). Course changes and projected seakeeping measures may be assessed.

An initial "plant" baseline for a ship might consist of the ship's response amplitude operator (RAO) calculated with simulation and refined with model tests. The commissioning baseline may also consist of RAOs established with an automatic open loop frequency response for the driven system (e.g., fins, foils, transom mounted devices, etc.) moving sinusoidally at discrete frequencies (e.g., 0.075, 0.1, 0.2, 0.3 Hz etc., for up to 20 or more frequencies that span the frequency range of expected response being driven) combined with a bandwidth capability assessment of each device.

Depending on the type of vessel hull form (monohull, catamaran, trimaran, etc.), the understanding of the existing and anticipated sea state can provide guidance on the best heading for ride quality long term. This may not be a direct route between two points. For example, in the case of catamarans bow seas are traditionally the worst operational heading. This information may be used for automated steering corrections over the overall voyage of the craft.

In simulation an RAO can predict the response given a type of input and, if the spectrum of the encounter sea is known, the result of a course or speed change may be predicted. If the spectrum of the far field sea is known (e.g., out to several kilometers, etc.), the response of a course/speed change to future motions, MSI, etc., may be predicted. The effect of gain magnitude for the vertical and lateral plane motions may also be evaluated.

Acceptable roll or pitch damping may require that the device can keep up with the command(s). Open loop tests may be used to establish the device response as a function of frequency. Gain and phase may define the response of the system both on the driven side and the hull response. It is important here for the command to be within the response capability of the motion control device.

In one embodiment, a multi-processing application with the analyzer 162 (shown in FIG. 3) producing reduced data (rather than raw data) may be used for the control algorithm to evaluate a recent running Power Spectral Density (PSD) (e.g., most recent X minutes updated every Y seconds, etc.).

A simulator may be used to implement the various functions and their application to the range of devices. In principle, the generation of frequency response models for the ship and the analysis of data representing sea contours has a range of tested techniques. Establishing the relative importance and sequences of application in real time may be used to design a superior MCS that combines the best of current technology with the application of future technology.

Figure 4:
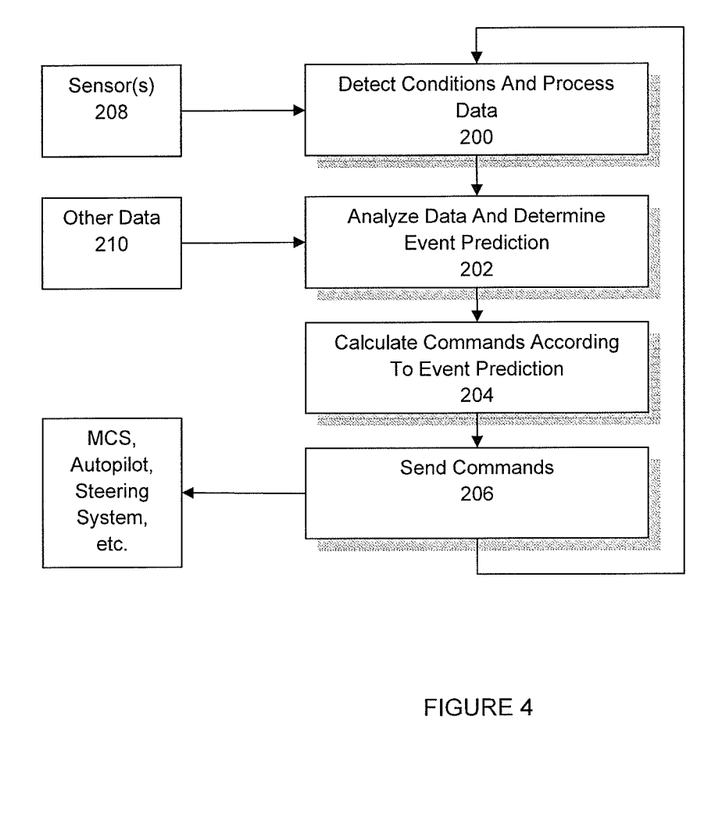
FIG. 4 is a flowchart of one embodiment of a method according to the present teachings for using the system of FIG. 3.

Referring now to FIG. 4, shown is a flowchart of one embodiment of a method according to the present teachings for using the system of FIG. 3. As discussed previously, conditions may be detected 200 (ship motion, far field future, near field future, etc.). This may include receiving data from one or more sensors 208 and processing the data (e.g., normalizing, etc.) for use with the system.

The system may analyze data and determine event prediction 202. This may include receiving other data 210 (historical data, etc.). The system may calculate commands according to the event prediction 204. Next, the system may send commands 206, including, for example, to the MCS 212 and/or autopilot, steering system, etc.

Figure 5:
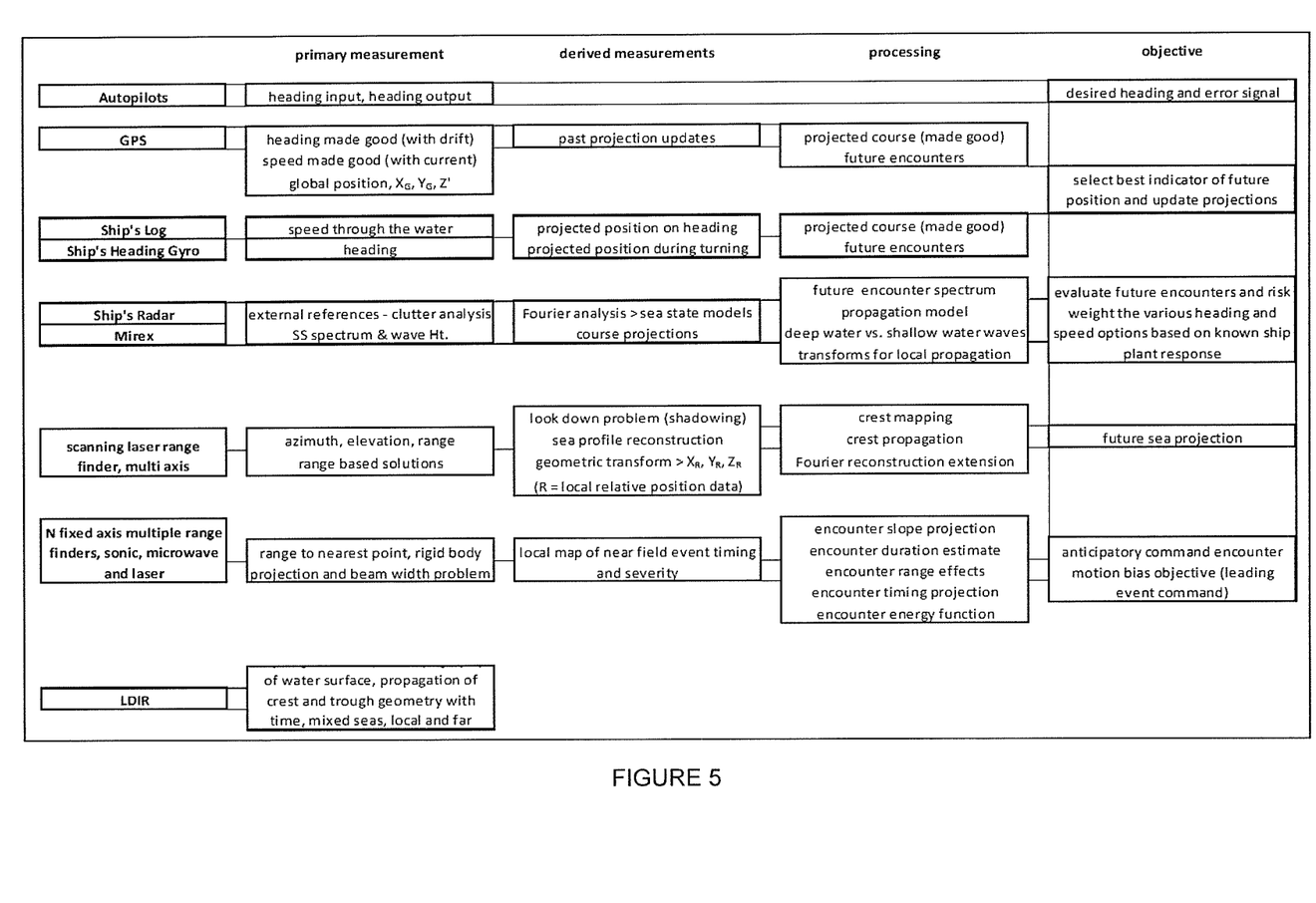
FIGS. 5-7 are outlines for using various devices according to the present teachings.
Figure 6:
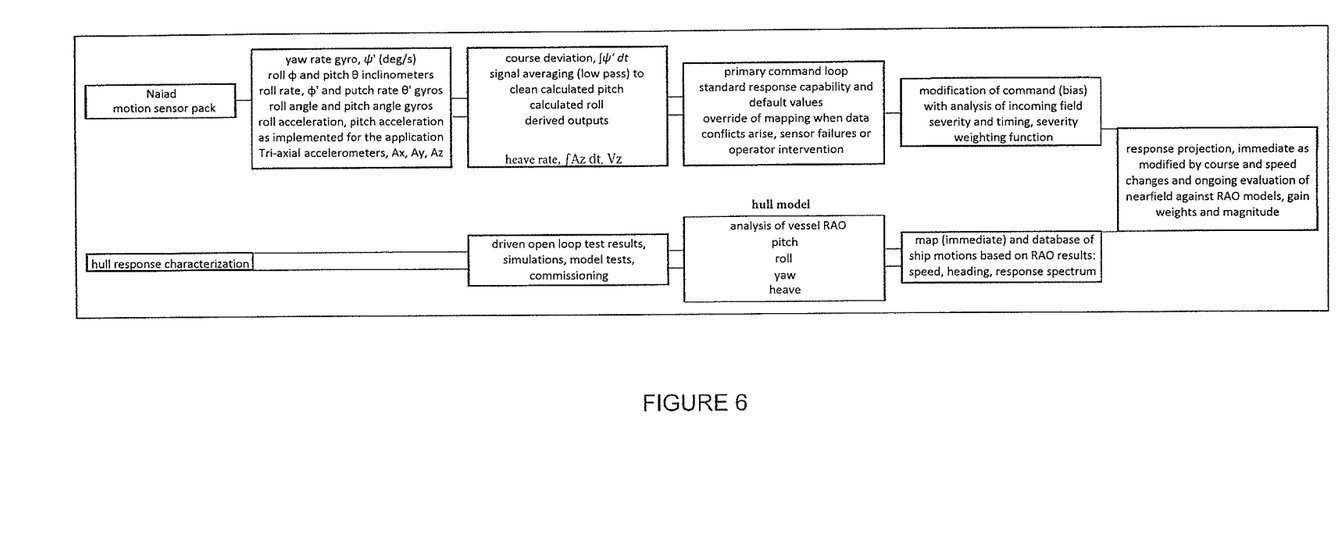
Figure 7:
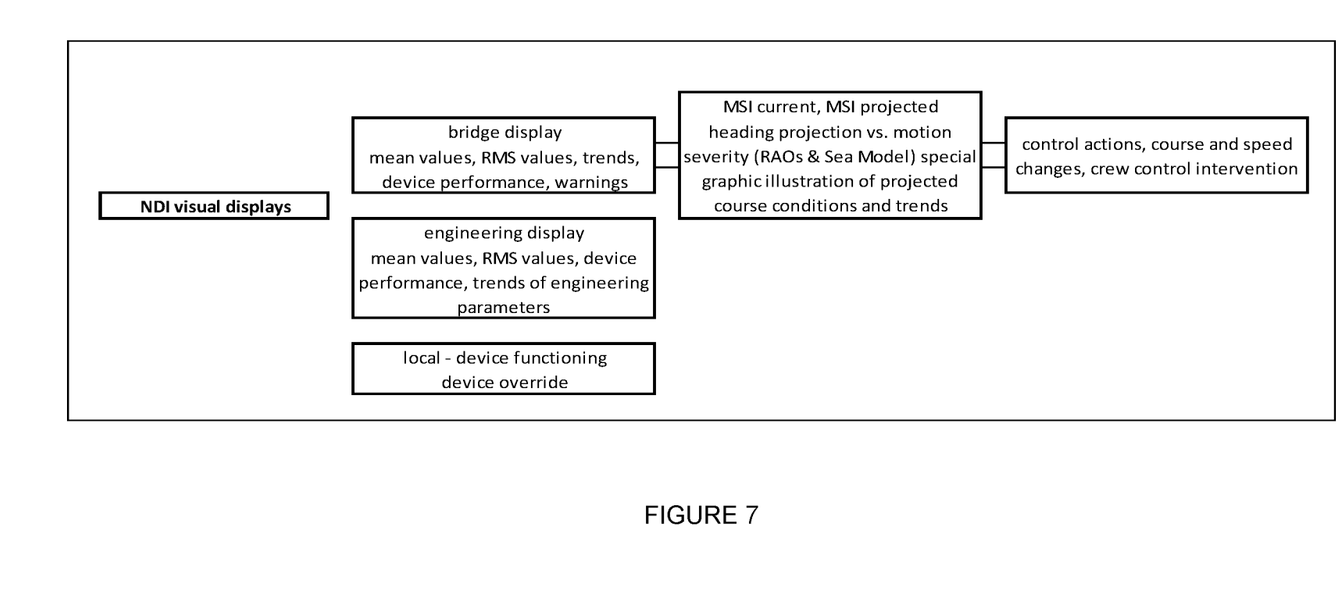

Referring to FIGS. 5-7, shown are outlines for using various devices according to the present teachings. These are functional block level illustrations to provide an overview of one embodiment of the present teachings. Referring to FIG. 5, shown is an outline of external devices (e.g., sensors, etc.) that may be used. Referring to FIG. 6, shown are some MCS capabilities and hardware. Referring to FIG. 7, shown are outputs to an NDI system. These are exemplary in nature and not limiting.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for controlling a seafaring vessel which is underway, comprising the steps of:
providing a control system for the vessel;
detecting current sea conditions using one or more sensors which are configured to measure sea conditions in both the far field and near field, the far field being defined as four or more wavelengths from the vessel, and, the near field being between the vessel and the far field;
retrieving historical sea condition data from a storage;
determining a not yet existing predicted sea condition anticipated to be encountered by the vessel in the future in the far field, on a computer;
calculating one or more commands, on a computer, using the predicted sea condition; and
sending the one or more commands to the control system;
wherein the control system automatically implements at least one of the one or more commands for the vessel in anticipation of the predicted sea condition.

2. The method of claim 1 further comprising the step of providing a storage having historical vessel motion data and historical sea condition data, wherein the one or more commands are based at least in part on the historical vessel data and the historical sea condition data.

3. The method of claim 1 wherein the historical sea condition data is updated in the storage based on the detecting of current sea conditions.

4. The method of claim 1 wherein the far field comprises a distance of one kilometer from the vessel.

5. The method of claim 1, wherein the near field is over an area adjacent to the vessel that is less than 10 times the wave length.

6. The method of claim 1 wherein the one or more commands comprises configurations for one or more of the vessel's hydraulic systems in preparation for the predicted sea condition.

7. The method of claim 1 wherein the one or more commands comprises configurations for one or more of the vessel's electrical systems in preparation for the predicted sea condition.

8. The method of claim 1 wherein the at least one control system comprises an auto pilot system.

9. The method of claim 8 wherein the one or more commands comprises an input for the auto pilot system.

10. The method of claim 9 wherein the one or more commands comprises a new heading.

11. A method of controlling a seafaring vessel which is underway, comprising:
providing a control system for the vessel;
detecting current sea condition data using one or more sensors, the sea condition data including sea conditions in both the seafaring vessel's far field and near field;
retrieving historical sea condition;
analyzing on a computer the current sea condition data and the historical sea condition data and determining a not yet existing predicted sea condition anticipated to be encountered by the vessel in the future in the far field based at least in part on both the current sea condition data and the historical sea condition data, wherein the near field represents an area between a minimum and a maximum, the minimum being a sufficient lead time to implement one or more commands in response to a predicted encounter and the maximum being at least two wavelengths from the minimum and the far field being beyond the maximum;
calculating the one or more commands in preparation for the predicted encounter determined by the analyzing step; and
implementing at least one of the one or more commands via the control system to activate one or more control devices in response to the predicted sea condition.

12. The method of claim 11, wherein the near field sea condition data is used to characterize wave mapping over an area adjacent to the seafaring vessel.

13. The method of claim 11 further comprising an auto pilot system, wherein the one or more commands comprise a new heading for the seafaring vessel.

14. The method of claim 11 further comprising a storage having historical vessel motion data, wherein the one or more commands are based at least in part on the historical vessel data.

15. The method of claim 11 wherein the at least one of the one or more commands includes a course correction based on the sea condition data related to the far field.

16. The method of claim 11 wherein the preparation for the predicted encounter is configured to reduce effects of the predicted encounter on the vessel.

17. A motion control system for a seafaring vessel which is underway, comprising:
a plurality of sensors generating current sea condition data, the sea condition data including sea conditions in both the seafaring vessel's far field and near field;
a storage having historical sea condition data stored thereon;
a motion control system having one or more motion control devices; and
a computer having:
an analyzer receiving the current sea condition data and the historical sea condition data and determining a not yet existing predicted sea condition anticipated to be encountered by the vessel in the future in the far field based at least in part on both the current sea condition data and the historical sea condition data, wherein the near field represents an area between a minimum and a maximum, the minimum being a sufficient lead time to implement one or more commands in response to a predicted encounter in order to reduce effects of the predicted encounter on the vessel;
the maximum being at least two wavelengths from the minimum;
the far field being beyond the maximum;
a calculator calculating the one or more commands in preparation for the predicted sea condition determined by the analyzer; and
an interface communicating at least one of the one or more commands calculated by the calculator to the motion control system;
wherein the motion control system automatically activates the one or more motion control devices in response to the predicted sea condition using the at least one of the one or more commands calculated by the calculator.

18. The system of claim 17 further comprising an auto pilot system, wherein the one or more commands comprise a new heading for the seafaring vessel.

19. The system of claim 17 wherein the one or more commands comprises configurations for one or more of the vessel's hydraulic systems in preparation for the predicted sea condition.

* * * * *